(12) United States Patent
　　　Li (10) Patent No.: US 9,547,376 B1
(45) Date of Patent: Jan. 17, 2017

(54) MAGIC CUBE INPUT SYSTEM

(71) Applicant: Chien-Wen Li, Taichung (TW)

(72) Inventor: Chien-Wen Li, Taichung (TW)

( * ) Notice: Subject to any disclaimer, the term of this patent is extended or adjusted under 35 U.S.C. 154(b) by 21 days.

(21) Appl. No.: 14/809,799

(22) Filed: Jul. 27, 2015

(51) Int. Cl.
| | |
|---|---|
| *G06F 3/023* | (2006.01) |
| *G06F 3/0346* | (2013.01) |
| *G06F 3/0354* | (2013.01) |
| *G06F 3/02* | (2006.01) |
| *G06F 3/041* | (2006.01) |
| *G06F 3/0362* | (2013.01) |
| *G06F 3/01* | (2006.01) |
| *G06F 3/0488* | (2013.01) |
| *G06F 3/0485* | (2013.01) |
| *G06F 3/16* | (2006.01) |
| *G06F 17/27* | (2006.01) |

(52) U.S. Cl.
　　CPC .............. *G06F 3/0236* (2013.01); *G06F 3/017* (2013.01); *G06F 3/0213* (2013.01); *G06F 3/0346* (2013.01); *G06F 3/0362* (2013.01); *G06F 3/03543* (2013.01); *G06F 3/0416* (2013.01); *G06F 3/0485* (2013.01); *G06F 3/04883* (2013.01); *G06F 3/04886* (2013.01); *G06F 3/167* (2013.01); *G06F 17/274* (2013.01); *G06F 2203/0381* (2013.01); *G06F 2203/0382* (2013.01); *G06F 2203/04802* (2013.01)

(58) Field of Classification Search
　　CPC combination set(s) only.
　　See application file for complete search history.

(56) References Cited

U.S. PATENT DOCUMENTS

| | | | |
|---|---|---|---|
| 9,430,988 B1 * | 8/2016 | Hancock .................. G09G 5/10 |
| 2007/0035564 A1 * | 2/2007 | Katsuyama ........ H04N 1/00408 |
| | | | 345/649 |

* cited by examiner

*Primary Examiner* — Van Chow (57) ABSTRACT

A magic cube input system comprises a control module, a page module, a quick pick module, and a function module; the function module performs selection of a character input mode or a screen keyboard change mode. Under the character input mode, the control module receives voice instructions or motion instructions to control page scrolling of the page module, pick an initial character and subsequent characters successively after the initial character being picked, and the quick pick module presents commonly used characters or vocabularies to be picked up quickly through the control module. Under the screen keyboard change mode, the control module receives the voice instructions or motion instructions to control the page scrolling of the page module and select a suitable screen keyboard via the page scrolling so as to perform character or symbol input or the screen keyboard quick change.

7 Claims, 9 Drawing Sheets

MAGIC CUBE INPUT SYSTEM

BACKGROUND OF THE INVENTION

1. Field of the Invention

The present invention relates to an input system for smart devices especially wearable smart devices and portable smart devices, and more particularly to an input system which is controlled with voices, touches, gestures, a mouse, key pressing, knob turning, sensing or remote control to attain purposes of conversion for screen keyboards and character or symbol input.

2. Description of Related Art

The currently used input technology is keying data with a keyboard, clicking a virtual keyboard on a screen with a mouse, touching the virtual keyboard on the screen, or reading out words. However, the traditional key arrangement on the keyboard, input mode, and inconvenient screen keyboard change are hardly to satisfy a variety of smart products. For example:

1. The conventional keyboard or mouse is inconvenient to be carried.

2. The keys on the conventional keyboard or virtual keyboard on the screen are close to each other such that it is easy to touch a wrong key inadvertently or not easy to find a right key conveniently.

3. The wearable devices provide a limited screen size and the screen is hard to be touched directly such that it is unfavorable for the user to conduct input with the virtual keyboard on the screen.

4. The conventional voice input system needs to recognize a lot of pronunciations of words, but the recognition rate thereof is affected by the surroundings and personal accents easily.

5. During operating the conventional voice input system, the user has to readout word by word clearly, and it results in the privacy is not confidential.

6. Steps to perform conversion between the screen keyboards are very complicated with inadequate intuition.

SUMMARY OF THE INVENTION

The present invention provides a magic cube input system to overcome one more preceding deficiencies.

The magic cube input system according to the present invention comprises a control module, a page module, a quick pick module, and a function module; wherein the function module performs a selection from a character input mode or a screen keyboard change mode; under the character input mode, the control module receives voice instructions or motion instructions which include a gesture, touch, mouse, key pressing, knob turning, sensing and controller done by a user, controls the page module to conduct page scrolling, picks an initial character, and picks subsequent characters successively after the initial character being picked, wherein the quick pick module presents commonly used characters or vocabularies to be picked up quickly through the control module; under the screen keyboard change mode, the control module receives the voice instructions or motion instructions which include a gesture, touch, mouse, key pressing, knob turning, sensing and controller done by the user, controls the page module to conduct page scrolling, and selects a screen keyboard suitable for the user via the page scrolling, and the respective modules operate with each other to perform word or symbol input or quick change of the screen keyboards.

In a preferred embodiment in accordance with the present invention, the control module further comprises a voice control unit to receive the voice instructions which include "up", "down", "left" and "right" to control the page scrolling, numbers "1", "2", "3", "4", "6", "7", "8" and "9" to execute the character selection; "move forward", "move backward". "delete", "confirm" and "transmit" to perform the word input or message transmission.

In the preferred embodiment of the present invention, the control module further comprises a motion control unit which receives the motion instructions of the gesture, touch, key pressing, knob turning, sensing or mouse, and includes control of the page scrolling and the character selection.

In the preferred embodiment of the present invention, the page module provides a virtual cube which is a magic cube analog with a nine-rectangle grid on all sides of the cube, and the characters are distributed in the nine-rectangle grid respectively; the page module further comprises a page scrolling unit, a candidate page unit and an else page unit wherein the page scrolling unit receives the instructions to carry out the page scrolling, the candidate page unit presents awaiting-picked characters right in front of the user, and the else page unit provides characters other than the candidate page unit with a corresponding prompt; the else page unit is capable of being converted to the candidate page unit via the page scrolling unit.

In the preferred embodiment of the present invention, the quick pick module further comprises a character quick pick unit and a vocabulary quick pick unit; the character quick pick unit presents the common used characters or the availably combined characters automatically for being picked as the subsequent character after the initial character being picked, and the vocabulary quick pick unit presents the common used vocabularies or availably combined vocabularies automatically according to changes arisen from the initial character being picked.

In the preferred embodiment of the present invention, the function module further comprises a keyboard control unit which controls the page scrolling unit of the page module to scroll the page upward, downward, leftward or rightward so as to convert the screen keyboard quickly via the voice instructions recognized by the voice control unit or the motion instructions of a gesture, touch, mouse, key pressing, knob turning, sensing and controller recognized by the motion control unit.

In the preferred embodiment of the present invention, the magic cube input system is compatible with computers, smart televisions, tablets, mobile phones, smart watches, smart hand rings, and smart glasses to perform character or symbol input or the screen keyboard quick change.

The magic cube input system according to the present invention is mainly used for character and symbol input and screen keyboards conversion. With one of the purposes, characters and symbols are distributed on a page of a magic cube analog, and the characters are input via the page of the cube being scrolled to achieve the purpose of character being picked; the magic cube input system can be applied to various smart devices, the characters are simply arranged, and the system is controlled easily via simple voice instructions such as "up", "down", "left" and "right", numbers "1", "2", "3", "4", "5", "6", "8" and "9", "move forward","move backward", "delete", "confirm", "transmit", "switch", "quickly pick" and "convert" to complete character input and message transmission so as to enhance recognition and control facility to avoid leakage of the input data; the magic cube input system also can be controlled to pick characters via a gesture, touch, mouse, key pressing, knob turning, sensing or controller. With the other one of the purposes, different screen keyboards which are presented on different pages can be scrolled to attain screen keyboard conversion fast via a gesture, touch, mouse, key pressing, knob turning, sensing or controller. The present invention can be operated with character and symbol input speedily and effectively at any locations.

The magic cube input system in accordance with the present invention is a word and message input system with which characters and symbols are arranged in a nine-angle grid on each surface of a magic cube analog or various screen keyboards are converted there between by way of page rolling; the magic cube input system conducts the character and symbol input via control of page rolling to pick characters or conversions of the screen keyboards. The magic cube input system is suitable for various smart devices such as computers, smart televisions, tablets, mobile phones, smart watches, smart hand rings, and smart glasses; it is not only easier and faster for the word input but also capable of solving input problems resulting from too small screen provided by the wearable devices and hand held devices or the screen being unable to be touched directly.

BRIEF DESCRIPTION OF THE DRAWINGS

Further benefits and advantages of the present invention will become apparent after a careful reading of the detailed description with appropriate reference to the accompanying drawings.

DETAILED DESCRIPTION OF THE INVENTION

Figure 1:
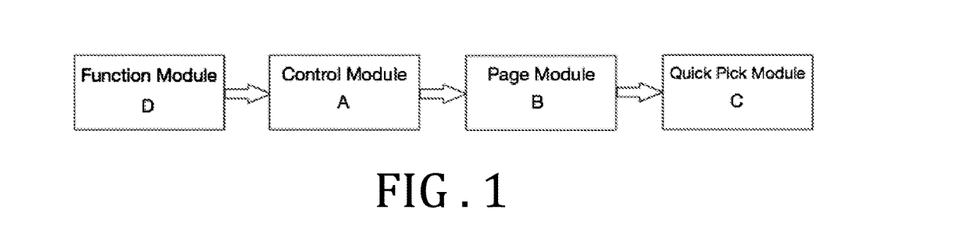
FIG. 1 is a block diagram showing module operations related to a magic cube input system according to the present invention.
Figure 2A:
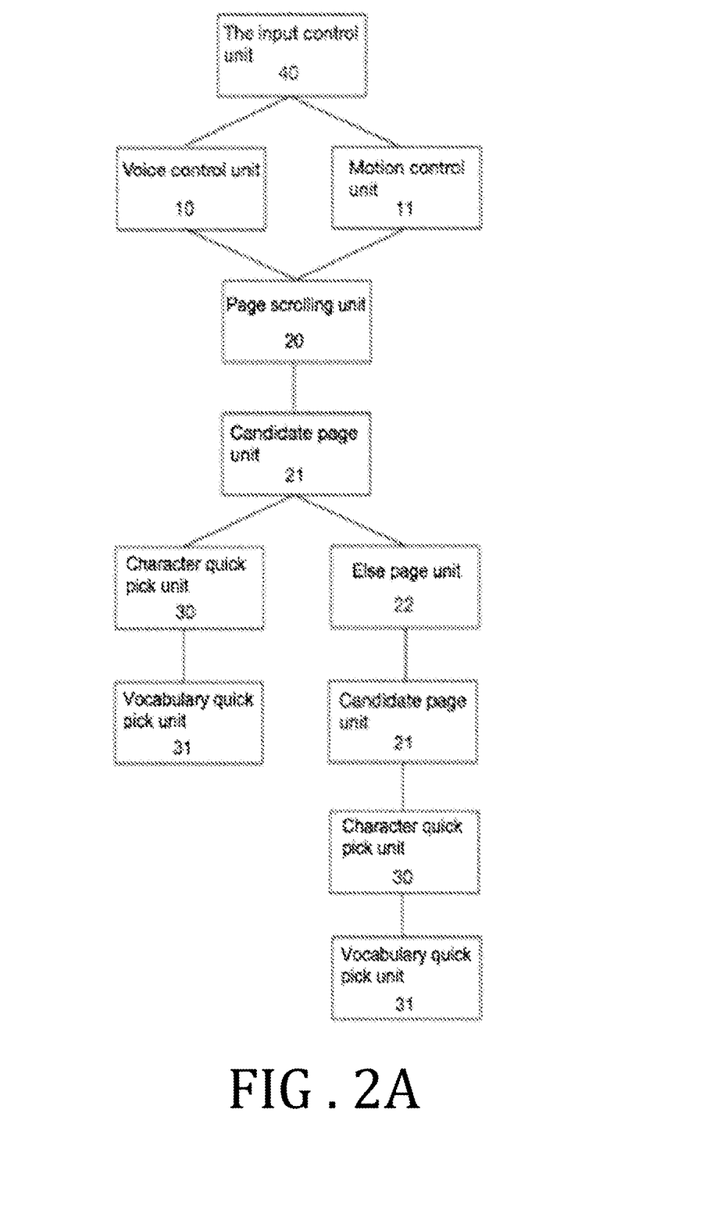
FIGS. 2A and 2B are block diagrams showing process of the preferred embodiment according to the present invention.
Figure 2B:
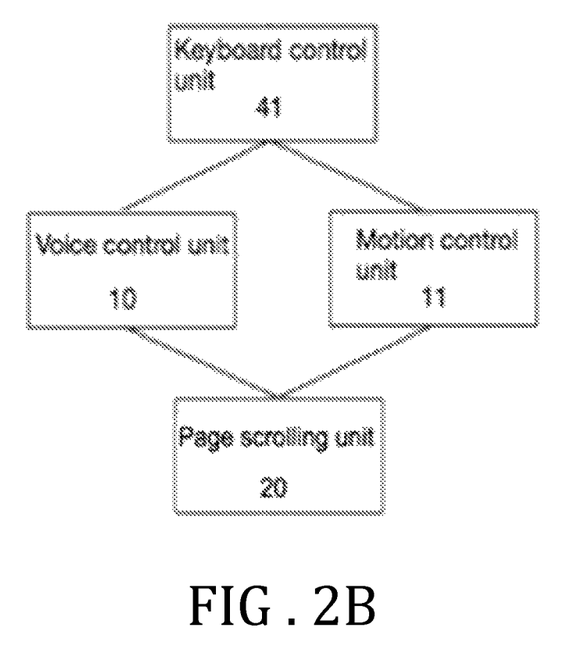

Referring to FIGS. 1, 2A and 2B, the magic cube input system in accordance with the present invention comprises a control module A, a page module B, a quick pick module C and a function module D; the control module A provides a voice control unit 10, and a motion control unit 11; the page module B provides a page scrolling unit 20, a candidate page unit 21, an else page unit 22; the quick pick module C provides a character quick pick unit 30, a vocabulary quick pick unit 31; the function module D provides an input control unit 40 and a keyboard control unit 41; the input control unit 40 is primarily employed to start input function of the magic cube input system and receive voice instructions done by the user via the voice control unit 10, the motion control unit 11 is primarily employed to receive control instructions done by the user via a gesture, touch, mouse or controller, the page scrolling unit 20 is primarily employed to coordinate with the voice control unit 10 or the motion control unit 11 to scroll pages, the candidate page unit 21 is primarily employed to present characters which await to be picked, the else page unit 22 is primarily employed to present and prompt other characters, the character quick pick unit 30 is primarily employed to operate the commonly used characters or availably combined characters presented at the candidate page unit 21 automatically for being picked according to changes arisen from an initial character being picked, the vocabulary quick pick unit 31 is primarily employed to present commonly used or availably combined vocabularies automatically for being picked after the initial character is picked; the keyboard control unit 41 is employed to start conversion of the keyboard of the input system of the magic cube and join with the voice control unit 10 or the motion control unit 11 to operate the page scrolling unit 20 such that fast conversion between various screen keyboards can be attained. Therefore, the purposes of the character and symbol input and fast conversion of the screen keyboard can be reached through all the units being operated interactively.

Figure 3:
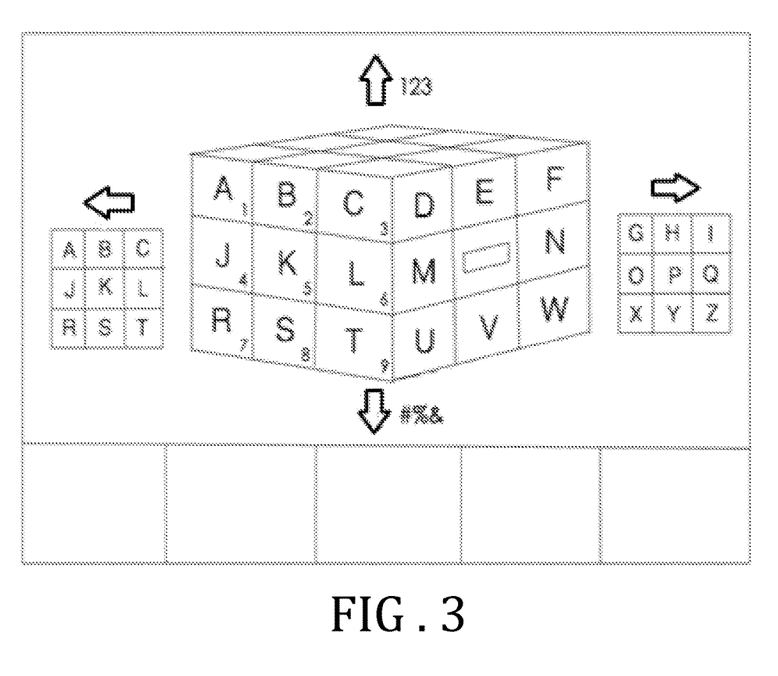
FIG. 3 is a schematic diagram illustrating character arrangement of the preferred embodiment according to the present invention.

Referring to FIG. 3, page and character arrangement of the preferred embodiment according to the present invention is illustrated. The magic cube input system provides a character arrangement with a magic cube analog and a nine-rectangle grid with presentation of characters of else page by prompt to not only allow the input characters to be arranged clearly but also to reduce the characters on a single page largely and increase touch area, enlarge the character sizes, and enhance convenience and speed while picking the characters.

Figure 4:
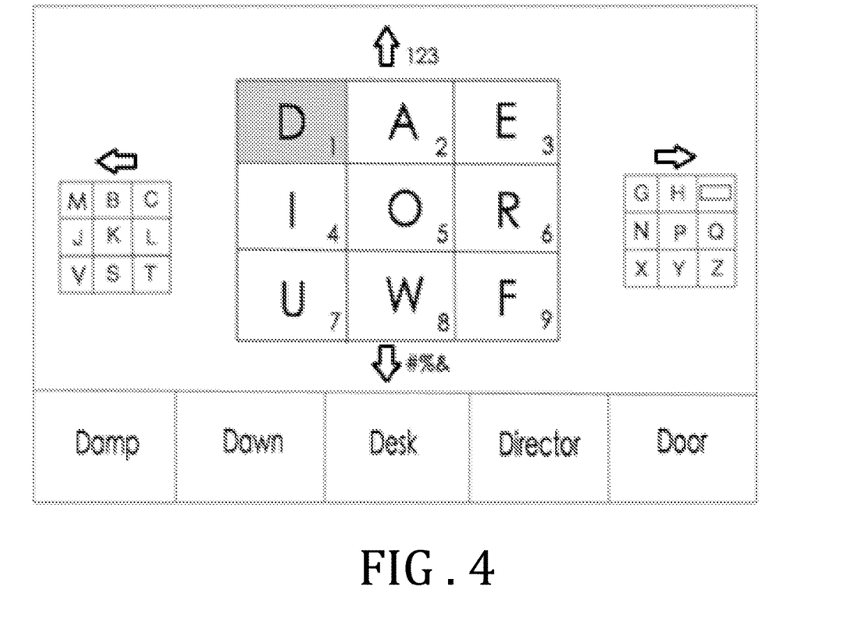
FIG. 4 is a schematic diagram illustrating quick pick function of the preferred embodiment according to the present invention.
Figure 5:
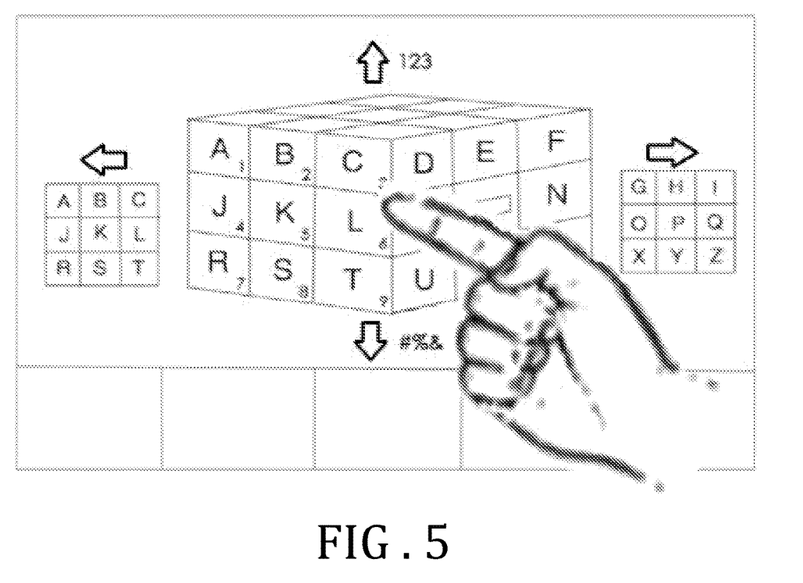
FIG. 5 is a schematic diagram illustrating motion control of the preferred embodiment according the present invention.
Figure 6:
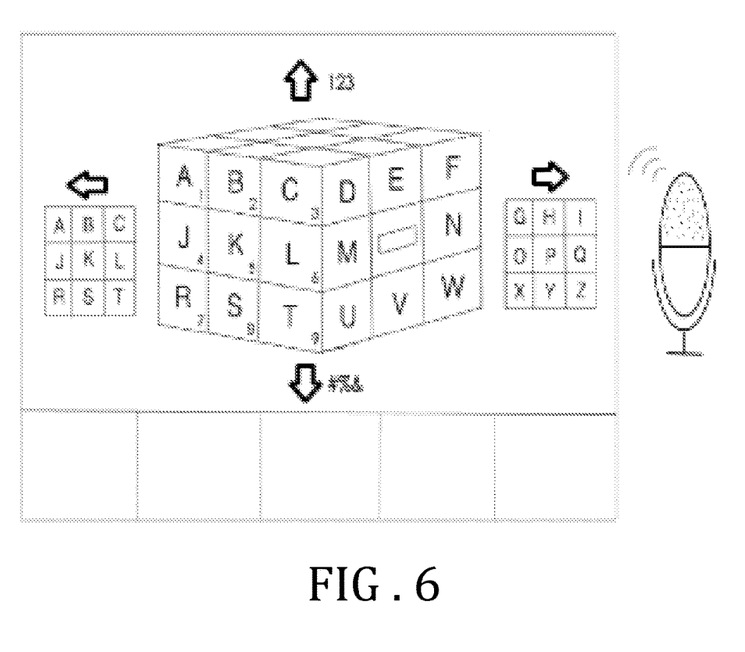
FIG. 6 is a schematic diagram illustrating voice control of the preferred embodiment according the present invention.

Referring to FIGS. 2A, 2B, and 4, operation and quick pick of the preferred embodiment according to the present invention is illustrated. When the operation is performed to control the page scrolling unit 20 to scroll the page of the magic cube input system till reaching the candidate page unit 21, a character selection is initiated. After an initial character is picked, the preceding operation can be repeated to pick a subsequent character at the candidate page unit 21 or as soon as the else page unit 22 is scrolled to the candidate page unit 21, the subsequent character is picked. Also, it can be done with the common used characters represented automatically at the character quick pick unit 30 quickly or the common used vocabularies or the availably combined vocabularies represented automatically at the vocabulary quick pick unit 31 quickly.

Implementation I: Referring to FIGS. 2A, 2B, 5, 6, and 8, the user controls the magic cube input system via voice instructions or motion instructions; the voice control unit 10 receives the voice instructions done by the user such as "up", "down", "left" and "right" or the motion control unit 11 receives the motion instructions done by the user such as a gesture, touch, mouse, key pressing, knob turning, sensing and remote control to control the page scrolling unit 20 to scroll the page till the candidate page unit 21 is reached; thus, the voice instructions corresponding to numbers including "1", "2", "3", "4", "5", "6", "7", "8" and "9" are executed via the voice control unit 20 or the motion instructions corresponding to the gestures, touches, mouse, key pressing, knob turning, sensing and remote control are executed via the motion control unit 11 to perform character selection. After the initial character being picked, the subsequent character is picked at the candidate page unit 21, or the else page unit 22 is turned to the awaiting-page unit 21 via the page scrolling unit 20 to pick other character. Finally, the purpose for attaining input, edition, deletion and transmission can be achieved via the voice instructions such as "move forward", "move backward", "delete", "confirm" and "transmit" or movement instructions such as the gestures, touches, mouse, key pressing, knob turning, sensing and remote control.

Implementation II: referring to FIGS. 2A, 2B, 5, 6 and 8, the user controls the magic cube input system via voice instructions or motion instructions such as the gestures, touches, mouse, key pressing, knob turning, sensing and remote control; the page scrolling unit 20 is controlled to execute the page scrolling via the voice control unit 10 or the motion control unit 11 to scroll the page till the candidate page unit 21 is reached; an initial character can be picked via the voice control unit 10 or the motion control unit 11, and after the initial character being picked, the character quick pick unit 30 automatically presents commonly used characters or availably combined characters at the candidate page unit 21 for a subsequent character being selected, or the vocabulary quick pick unit 31 automatically presents commonly used vocabularies or availably combined vocabularies due to changes arisen from the picked initial character; at this time, the subsequent character can be selected at the quick pick unit 30 or a vocabulary can be picked at the vocabulary quick pick unit 31 automatically via the voice control unit 10 or the motion control unit 11; also, the page can be scrolled from the else page unit 22 to the candidate page unit 21 via the page scrolling unit 20 for other character being picked.

Figure 7:
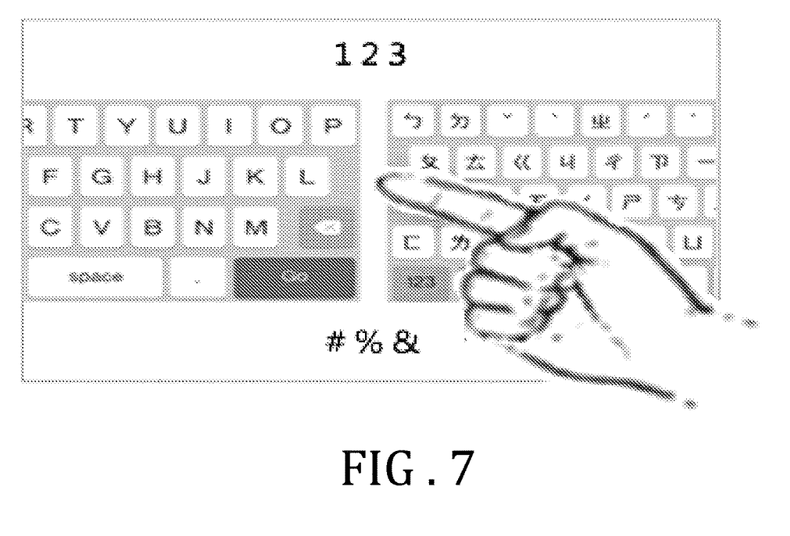
FIG. 7 is a schematic diagram illustrating keyboard conversion of the preferred embodiment according the present invention.
Figure 8:
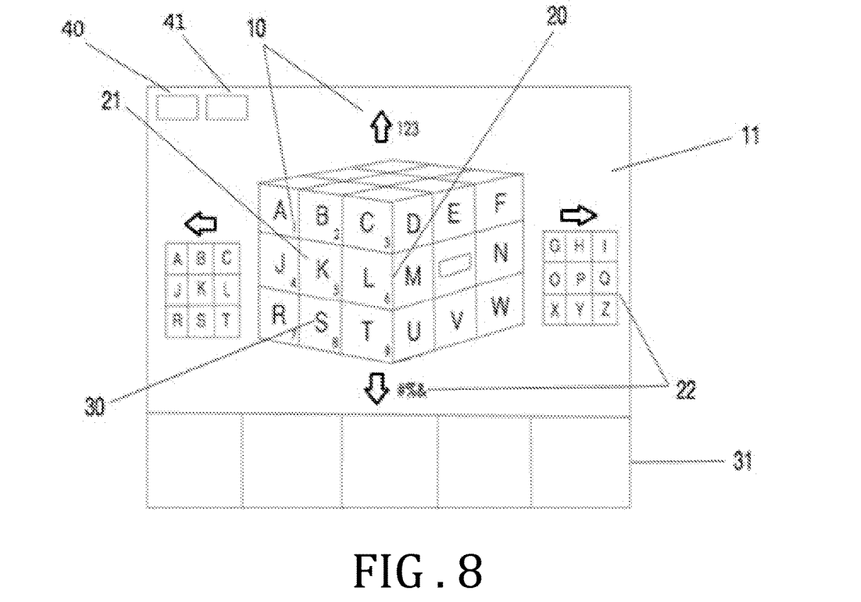
FIG. 8 is a schematic diagram illustrating structure of the preferred embodiment according to the present invention.

Implementation III: Referring to FIGS. 7 and 8, the user controls the magic cube input system via voice instructions or motion instructions such as the gestures, touches, mouse, key pressing, knob turning, sensing and remote control; the page scrolling unit 20 is controlled to execute the page scrolling via the voice control unit 10 or the motion control unit 11 to turn the page to perform quick changes between different screen keyboards.

It is appreciated that the magic cube input system in accordance with the present invention is a word and message input system with which characters and symbols are arranged in a nine-angle grid on each surface of a magic cube analog, or various screen keyboards are converted there between by way of page scrolling; the magic cube input system conducts the character and symbol input via control of page scrolling to perform character selection or conversion between the screen keyboards. The magic cube input system is compatible with various smart devices such as computers, smart televisions, tablets, mobile phones, smart watches, smart hand rings, and smart glasses; it is not only easier and faster for the word input but also capable of solving problems resulting from the wearable devices and hand held devices caused by too small screen or being unable to be touched.

Although the invention has been explained in relation to the preferred embodiments, it is to be understood that other possible modifications and variations can be made without departing from the spirit and scope of the invention as hereinafter claimed.

What is claimed is:

1. A magic cube input system, comprising a control module, a page module, a quick pick module, and a function module; wherein the function module performs a selection from a character input mode or a screen keyboard change mode;

under the character input mode, the control module receives voice instructions or motion instructions which include a gesture, touch, mouse, key pressing, knob turning, sensing and controller done by a user, controls the page module to conduct page scrolling, picks an initial character, and picks subsequent characters successively after the initial character being selected, wherein the quick pick module presents commonly used characters or vocabularies to be picked up quickly through the control module;

under the screen keyboard change mode, the control module receives the voice instructions or motion instructions which include a gesture, touch, mouse, key pressing, knob turning, sensing and controller done by the user, controls the page module to conduct page scrolling, and selects a screen keyboard suitable for the user via the page scrolling, and the respective modules operate with each other to perform character or symbol input or the screen keyboard quick change.

2. The magic cube input system as defined in claim 1, wherein the control module further comprising a voice control unit to receive the voice instructions which include "up", "down", "left" and "right" to control the page scrolling, numbers "1", "2", "3", "4", "5", "6", "7", "8" and "9" to execute the character selection; "move forward", "move backward", "delete", "confirm" and "transmit" to perform word input or message transmission.

3. The magic cube input system as defined in claim 1, wherein the control module further comprising a motion control unit which receives the motion instructions of the gesture, touch, key pressing, knob turning, sensing or mouse, and conduct operations including the page scrolling and character selection.

4. The magic cube input system as defined in claim 1, wherein the page module provides a virtual cube which is a magic cube analog with a nine-rectangle grid on all sides of the cube, and the characters are distributed in the nine-rectangle grid respectively; the page module further comprises a page scrolling unit, a candidate page unit and an else page unit wherein the page scrolling unit receives the instructions to carry out the page scrolling, the candidate page unit presents awaiting-picked characters right in front of the user, and the else page unit provides characters other than the candidate page unit with a corresponding prompt; the else page unit is capable of being changed to the candidate page unit via the page scrolling unit.

5. The magic cube input system as defined in claim 4, wherein the quick pick module further comprising a character quick pick unit and a vocabulary quick pick unit; the character quick pick unit presents commonly used characters or availably combined characters automatically for being picked as the subsequent characters after the initial character being picked, and the vocabulary quick pick unit presents commonly used vocabularies or availably combined vocabularies according to changes arisen from the initial character being picked.

6. The magic cube input system as defined in claim 3, wherein the function module further comprising a keyboard control unit which controls the page scrolling unit of the page module to scroll a screen page upward, downward, leftward or rightward so as to convert the screen keyboard quickly via the voice instructions recognized by the voice control unit or the motion instructions of a gesture, touch, mouse, key pressing, knob turning, sensing and controller recognized by the motion control unit.

7. The magic cube input system as defined in claim 1 is compatible with computers, smart televisions, tablets, mobile phones, smart watches, smart hand rings, and smart glasses to perform the character or symbol input or the screen keyboard quick change.

\* \* \* \* \*